Figure 1:
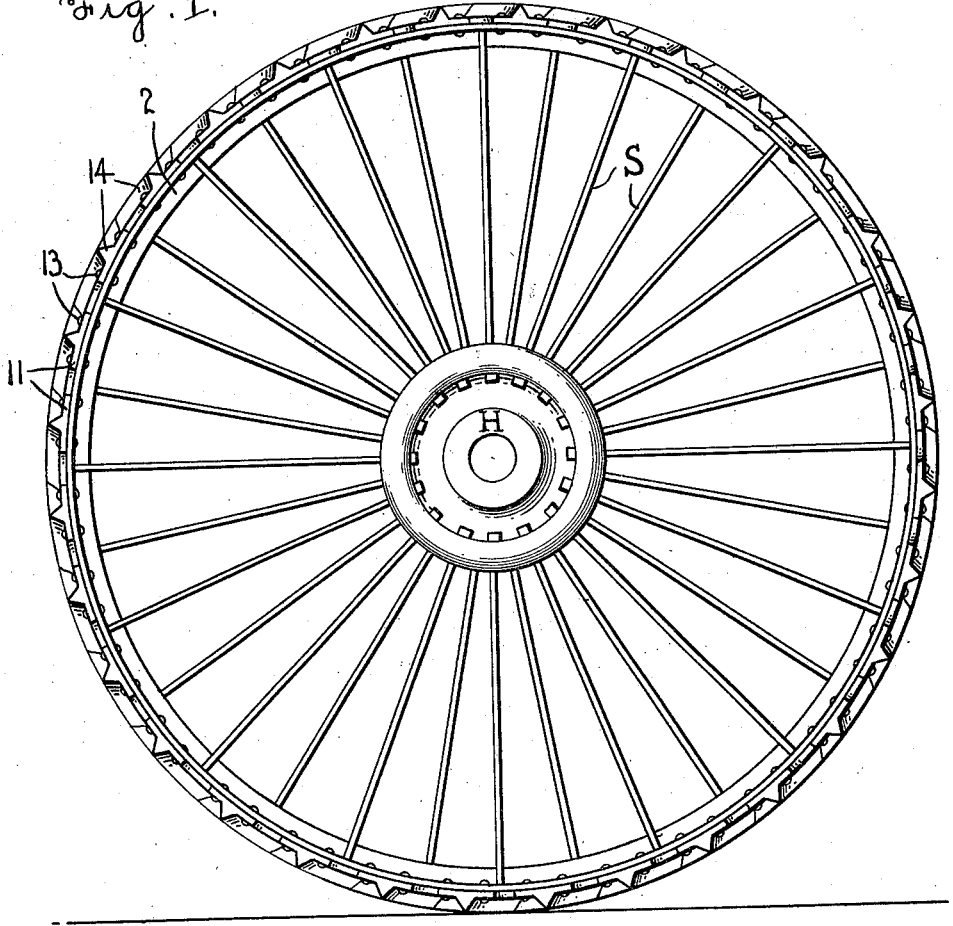

W. S. MORTON.
TRACTION WHEEL.
APPLICATION FILED DEC. 11, 1911.

1,036,682.

Patented Aug. 27, 1912.
2 SHEETS—SHEET 1.

Witnesses
L. B. James
N. L. Coblamer

Inventor
W. S. Morton
by H. B. Willson &co
Attorneys

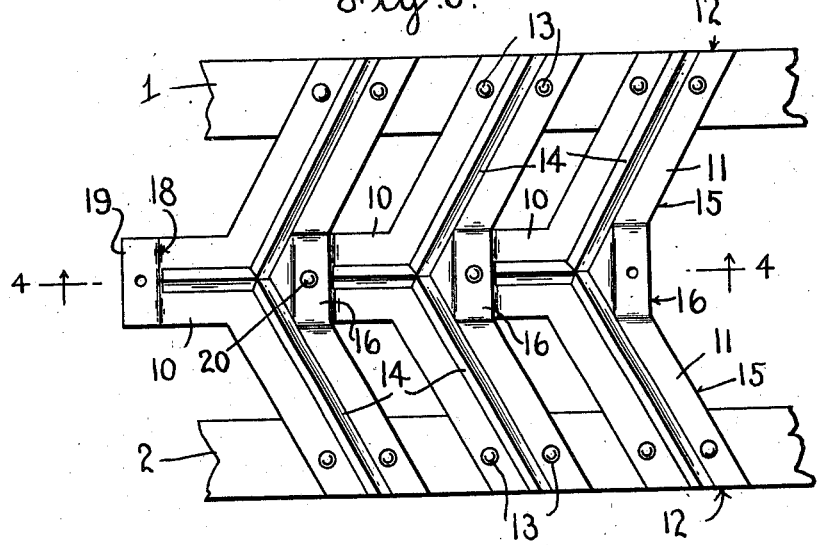
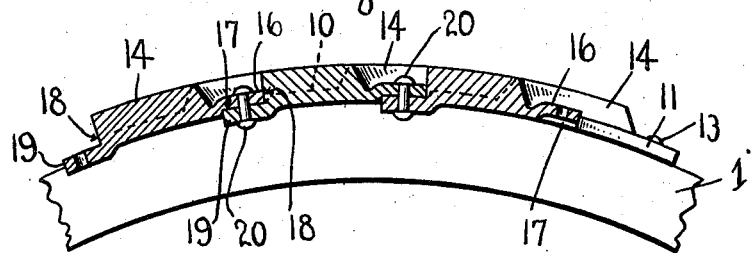
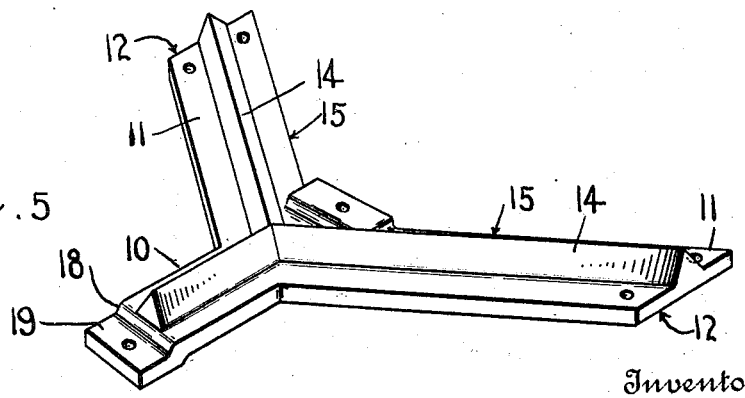

UNITED STATES PATENT OFFICE.

WALTER S. MORTON, OF HARRISBURG, PENNSYLVANIA.

TRACTION-WHEEL.

1,036,682.

Specification of Letters Patent.

Patented Aug. 27, 1912.

Application filed December 11, 1911. Serial No. 665,110.

*To all whom it may concern:*

Be it known that I, WALTER S. MORTON, a citizen of the United States, residing at Harrisburg, in the county of Dauphin and State of Pennsylvania, have invented certain new and useful Improvements in Traction-Wheels; and I do declare the following to be a full, clear, and exact description of the invention, such as will enable others skilled in the art to which it appertains to make and use the same.

This invention relates to road vehicles, and more especially to the traction wheels thereof; and the object of the same is to produce a light and strong open-work traction wheel having ribs which will engage the earth without slipping and so constructed that soil will not be likely to accumulate thereon. This and other objects are accomplished by following the details of the present specification and claims, as illlustrated in the drawings wherein—

Figure 2:
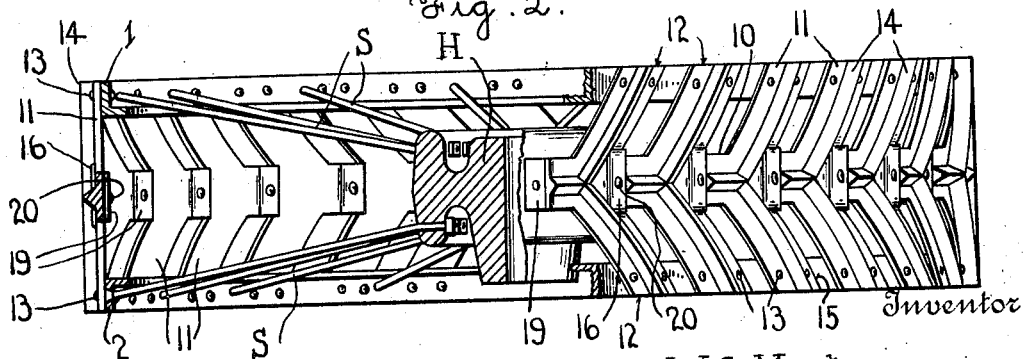

Figure 1, is a side elevation of this wheel complete; Fig. 2 is an edge view of the same, showing part of the wheel in plan and part of it in section; Fig. 3 is an enlarged plan view of a portion of the tire, and Fig. 4 is a longitudinal section on the line 4—4 thereof; Fig. 5 is a still further enlarged perspective detail of one of the Y-shaped members making up this tire.

In the drawings the letter H designates a hub whose detailed construction forms no part of the present invention, and S, S are two series of spokes, preferably of wire or rod, radiating and diverging from said hub to the tread of the wheel which is by preference of greater width than the length of said hub as shown, and whose detailed construction constitutes the gist of my invention. Said tread is composed of what might be called a rim and what might be called a tire attached to the rim. The latter is made of two angle irons 1 2, whose inner leaves stand in parallel planes at right angles to the axis of the hub and are spaced some distance from each other, and whose outer leaves stand in the same plane as shown in Fig. 2, and the outer ends of the spokes S may be secured to either leaf of each angle iron although they are herein shown as carried through and upset or riveted at 3 on the outside of the outer leaves. Said angle irons are thus rigidly connected with the hub and form the two members of a rim upon which the tire is secured as follows:

The tire of this improved traction wheel is made up of a number of sections or members best illustrated in detail in Figs. 3, 4 and 5, and as these members are alike I will describe but one. Each member consists of a three-legged or Y-shaped piece, cast or stamped from metal as preferred, and including a straight shank 10 disposed midway between the two angle-irons, and obliquely diverging arms 11 beveled off at their outer extremities as at 12 and which extremities are separated from each other a distance equal to the width of the entire wheel. The outer ends of the arms 11 overlap the angle-irons 1 2 and are riveted thereon as at 13, and along the outer face of the shank and the outer faces of both arms extends a rib 14 of any suitable shape and whose obvious purpose is for embedding in the earth. Where the outer edges 15 of the diverging arms 11 would naturally meet each other at an angle, this entire member if cast or stamped with a transverse throat 16 which makes this member a little stronger at the juncture of its arms with its shank; and the material of the member just in rear of this throat is cut out or struck up from the under side to produce a recess 17. The rear end of the rib 14 terminates at the point 18 on the outer side of the shank 10, and just in rear of said point the material of the shank is deflected inward into a tongue 19 whose shape and size is such that it will fit into the recess 17 of the contiguous member. The various members as thus constructed are applied around the rim and secured thereto by the rivets 13, with the tongue 19 of each member seated within the recess 17 of the member next adjacent, and rivets 20 are passed through said tongue and the bottom of the recess to hold the various members assembled.

As above suggested, the parts of this traction wheel may be of casting or of stamped wrought metal or the like, and it is quite within the province of my invention to use bolts instead of rivets.

Other details of construction may be amplified or changed without departing from the spirit of my invention.

A traction wheel as thus built can have an extremely wide tread without adding greatly to the weight of the wheel, its open-work structure permits the earth to fall through so that what is picked up by the ascending side of the wheel falls through it at or near the top of the same, such open-work structure also permits the workman or user to get at the rivets or bolts when repairs are needed and to replace them or to replace the members if they should become broken or bent. By preference the ribs 14 on the arms 11 of one member overlap the rear end 18 of the rib on the member next adjacent so that there is never a time when the ribs are not engaging the earth. With this end in view the arms of the Y-shaped piece are by preference formed at a considerable angle to each other and the shank 10 of such length that the idea just expressed will be carried out. The recess 17 may be cut out of the metal because the shape of the throat 16 permits, or the material of the member may be upstruck at this point to form the recess without sacrificing any of the metal, and the same may be said of the tongue 19 at the rear end of the shank 10. The rib 14 is of a size and cross section consistent with the work to be performed, and considerable latitude will be allowed the manufacturer in this particular.

What is claimed as new is:

1. The herein described traction wheel comprising a hub, two series of spokes radiating therefrom and diverging from each other, a rim made up of two angle-irons each connected with the outer extremities of one series of spokes, and a tread made up of individual three-legged members, two of whose legs are connected with said angle-irons and the third with the member next adjacent.

2. The herein described traction wheel comprising a hub, two series of spokes radiating therefrom and diverging from each other, a rim made up of two angle-irons each connected with the outer extremities of one series of spokes, and a tire made up of a series of three-legged members having outstanding ribs along their outer faces, the outer ends of two of the legs overlapping said angle-irons and being riveted thereto, and the end of the third leg being deflected into a tongue underlying the throat of the member adjacent and being riveted thereto.

3. The herein described traction wheel comprising a hub, two series of spokes radiating therefrom and diverging from each other, a rim made up of two angle-irons each connected with the outer extremities of one series of spokes, and a tire made up of a series of three-legged members having substantially flat bodies with radially projecting ribs leading inward from the extremities of two of said legs to the center and thence along the third leg to a point near its extremity, this leg being deflected inward in rear of said point so as to pass beneath the throat of the member adjacent, a rivet connecting these two members at the lapping point, and rivets through said angle irons and the outer ends of each of the other legs of said member.

4. The herein described traction wheel comprising a hub, spokes, a rim made up of two side strips carried by said spokes, and a tire made up of a series of Y-shaped members each of which has a throat formed between its arms and a recess on the inner side of its throat and each of which also has an inwardly bent tongue at the extremity of its shank shaped to fit the recess of the adjacent member, means for fastening each tongue in a recess, and means for securing the ends of each pair of arms to said rim strips.

In testimony whereof I have hereunto set my hand in presence of two subscribing witnesses.

WALTER S. MORTON.

Witnesses:
  HARRY W. KEENY,
  BERTHA A. MESSERSMITH.